Oct. 27, 1964  B. SILVESTON  3,154,118
FLUID LOADING RIG
Filed April 23, 1962  2 Sheets-Sheet 1
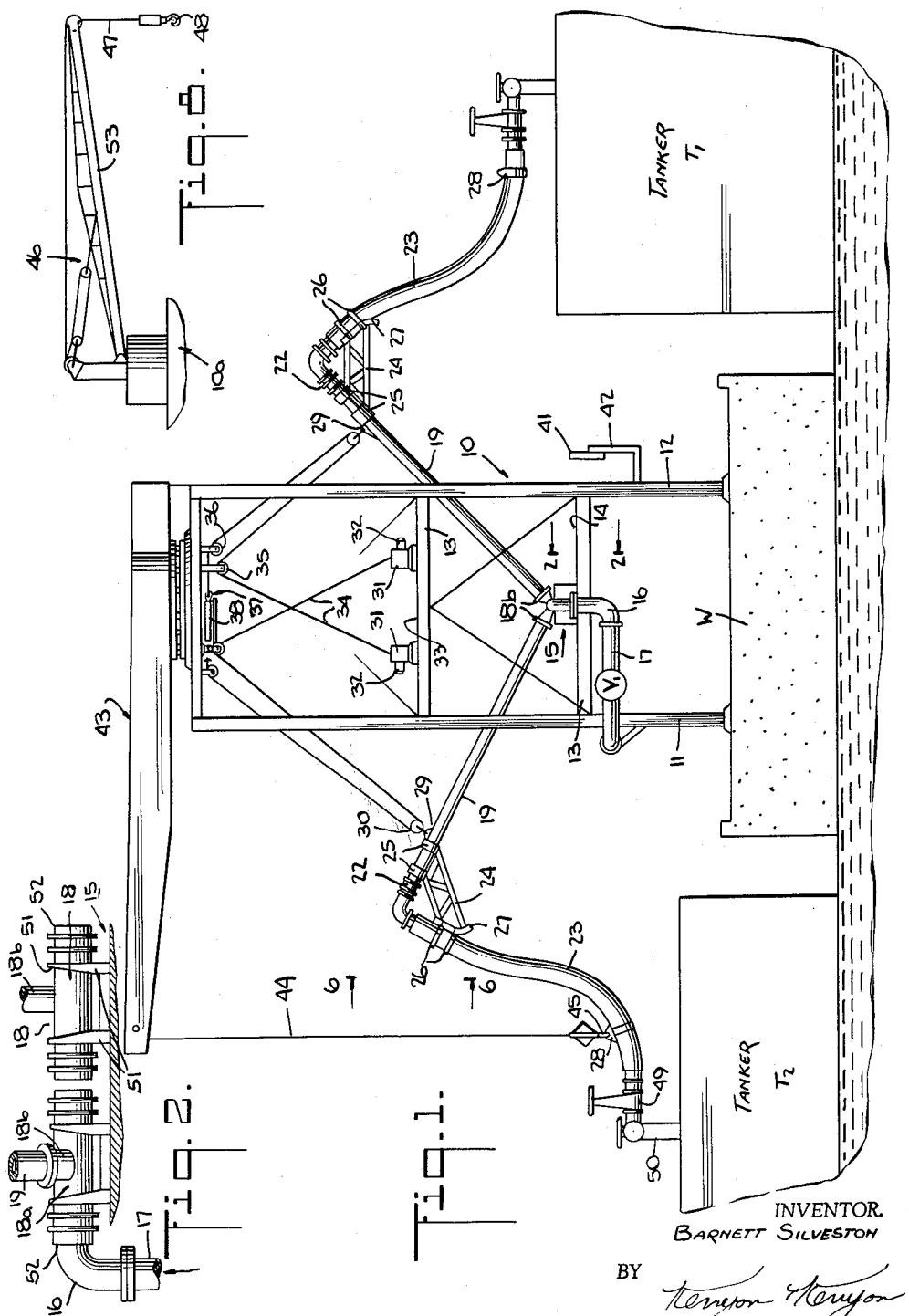
INVENTOR.
BARNETT SILVESTON
BY
Kenyon Kenyon
ATTORNEYS

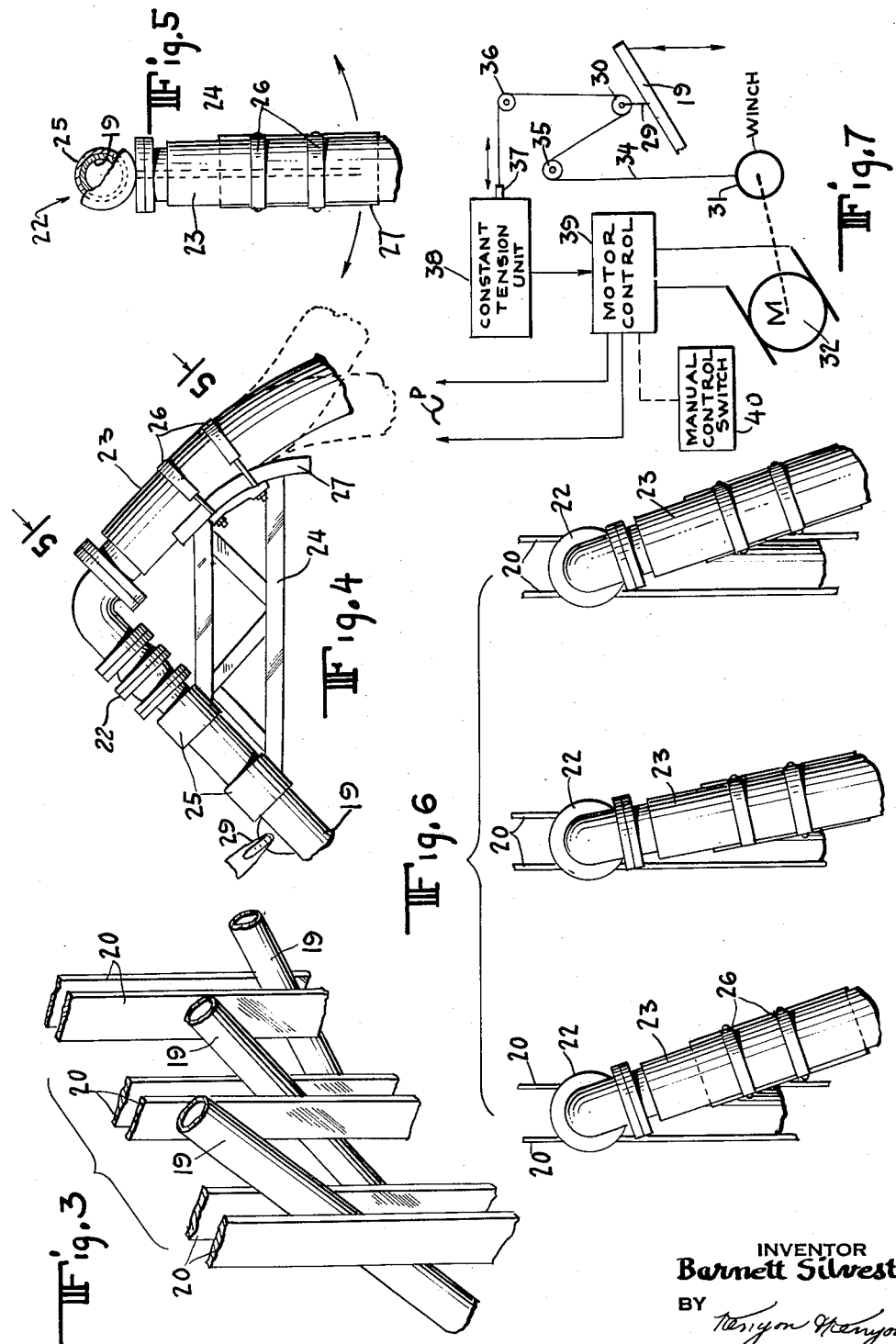

United States Patent Office 3,154,118
Patented Oct. 27, 1964

3,154,118
FLUID LOADING RIG
Barnett Silveston, New York, N.Y., assignor to Tippetts-Abbett-McCarthy-Stratton, New York, N.Y., a partnership
Filed Apr. 23, 1962, Ser. No. 192,022
6 Claims. (Cl. 141—388)

This invention relates to apparatus for transferring petroleum or other liquids between vessels, such as tankers, and shore lines. This application is a continuation-in-part of my copending application, Serial No. 801,565, filed March 24, 1959, now abandoned.

The size of petroluem tankers has increased greatly within recent years. Vessels of 45,000 deadweight tons, with cargo carrying capacities of about 325,000 barrels, are now comparatively common and large tankers up to 100,000 deadweight tons are in operation and under construction.

For economical operation of these large vessels, it is imperative that minimum time be spent in port. To this end, pumping rates of 30,000 barrels per hour are common. These developments have led to the use of large diameter cargo hoses which require special handling equipment at tanker terminals.

The problems involved in handling large diameter hoses fall into two separate categories. First, there are the problems associated with making the connection between the shore-based pipeline and the standpipe aboard the tanker. The second set of problems concerns the compensations which are required by the constantly changing relative positions of the ship and the shore-based pipeline during the loading or unloading operation.

As to the first set of problems discussed above, the cargo hoses of the diameters in use at the present time make it extremley difficult, if not impossible, to move and align the cargo hoses manually so that coupling may be made to the standpipe connections on the tanker. Accordingly, it is necessary to use mechanized equipment for this work. Labor costs also dictate the use of power means so that connection to the ship can be made in the shortest possible time and with a minimum of manpower.

It is necessary in any mechanized equipment of this type to have means for moving the seaward end of the cargo hose in a vertical direction, and other means, advantageously independently operable, for moving the seaward end of the cargo hose in a horizontal direction. This is necessary since the various tankers to be serviced will have standpipe connections at different vertical positions and also at different horizontal positions on the vessel itself. Accordingly, flexibility of movement is virtually a necessity.

The second set of problems discussed above involves providing means for compensating for changes in the relative positions of the standpipe on the ship being serviced and the shore-based pipeline during operations. Such changes in position may be in a vertical plane, due, for example, to the change in displacement of the vessel due to loading or unloading. Other relative movements may involve longitudinal movement of the vessel with respect to the dockside, lateral movement of the ship away from the dock area, or a combination of both.

Although the cargo hoses are commonly termed "flexible," they are not elastic and therefore the hoses themselves are not capable of taking up or compensating for the changes in relative position of the vessel during loading or unloading conditions.

Accordingly, it is an object of the present invention to provide an apparatus for transferring liquids between tankers and shore-based pipelines which is mechanized to the extent necessary to provide alignment of the seaward end of the cargo hose with the standpipe connection on board the ship.

Another object of the present invention is to provide an apparatus for transferring liquids between a tanker and a shore-based pipeline which compensates for any changes, vertical and/or horizontal, to the relative position of the standpipe connection on board the ship with respect to the same shore-based pipeline during the loading or unloading operation.

Briefly stated, one embodiment of the apparatus of the present invention comprises a tower, a relatively long rigid pipe connected at one end to a short pipe section to form a T, said short pipe section being mounted in a bearing assembly to permit rotation of said short pipe section about its axis, said bearing assembly being located at a relatively low level of said tower and being oriented to permit said rigid pipe to pivot in a vertical plane inwardly and outwardly of said tower, a first swivel joint connecting said short pipe section with a shore-based pipeline, guide means attached to said tower for confining pivotal movement of said rigid pipe in a vertical plane, a second swivel joint connected to the other end of said rigid pipe, a flexible conduit one end of which is connected to the said second swivel joint whereby the said conduit is rotatable with respect to the said rigid pipe, reinforcing means connected between said flexible conduit and said rigid pipe to prevent relative movement therebetween other than by rotation through said second swivel joint, power means connected to said rigid pipe to pivot said rigid pipe about said bearing assembly, crane means located adjacent the top of said tower and rotatable about a vertical axis, said crane mens being adapted to connect to and transport the other end of the flexible conduit in both horizontal and vertical directions, and means to automatically pivot said rigid pipe inwardly and outwardly of said tower in response to the changes in tension in said flexible conduit.

Other objects and features of the present invention will be discussed in conjunction with the accompanying drawings in which:

FIG. 1 is an elevational view of the rig of this invention depicting the servicing of two tankers on opposite sides of a pier;

FIG. 2 is a partial view taken along line 2—2 of FIG. 1;

FIG. 3 is a perspective view of a portion of the rig shown in FIG. 1;

FIG. 4 is an enlarged view of a joint between one of the rigid pipes of the rig and a cargo hose;

FIG. 5 is a view along line 5—5 of FIG. 4;

FIG. 6 is a view along the line 6—6 of FIG. 1;

FIG. 7 is a diagrammatic showing of manual and automatic winch motor control and constant tension monitoring for effecting desired pivotal motion of the rigid pipes; and FIG. 8 is an elevational view of a crane that can be used with the rig of FIG. 1.

Referring to the drawings, the rig of this invention comprises frame-like tower 10, preferably of steel, on the deck of a pier W. Tower 10 is preferably centrally located with respect to the opposite sides of the pier W so that tankers T₁ and T₂ may be serviced in berths at both sides of the pier W. The tower 10, in the embodiment shown, includes vertical columns 11 and 12 disposed on opposite sides and preferably positioned at its corners. Another set of columns 11 and 12 are behind those shown in FIG. 1. The lower ends of the columns 11 and 12 are anchored to the pier W in conventional manner. Alternatively, these columns may be mounted on a movable rail-supported base (not shown). Such alternative is particularly advantageous on a long wharf having multiple ship berths on both sides along its length so that the tower 10 may be moved along the length of the pier W for use at different berths.

The columns 11 and 12 are joined by appropriately located cross beams 13 to provide required rigidity. A lower platform 14 is provided, being supported, for example, by cross beams 13. Platform 14 serves to carry a distributing manifold 15 which is connected via elbows 16 to shore-based pipes 17. Each pipe 17 has an individual control valve $V_1$, and is connected via a pumping station (not shown) to a land based tank (not shown).

Manifold 15 includes a plurality of axially aligned T-shaped pipe connectors 18. Each connector 18 has a head portion 18a and leg portion 18b. Each connector 18 is cradled in a bearing assembly 51 for independently swiveling motion about the common axis of aligned head portions 18a. Swivel 52 is provided to permit connector 18 to rotate independently of elbow 16. Bearing assembly 51 is provided to reduce the strain on swivel 52 from eccentric movement of leg portion 18b.

The leg portions 18b are connected to respective rigid pipes 19. Rigid pipes 19 are best shown in FIG. 1. At this point in the description, it will be convenient to describe one individual assembly, since the several assemblies shown servicing tankers $T_1$ and tanker $T_2$ are identical.

Rigid pipe 19 extends outwardly and upwardly and passes between respective pairs of vertical guides 20 which are secured, for example, to cross braces 13. The relationship of guides 20 and rigid pipe 19 is best shown in FIG. 3. In the embodiment shown in the drawings, guides 20 are directly behind columns 11 and 12 in FIG. 1, and therefore cannot be seen in this view.

Rigid pipe 19 is prevented from moving in a lateral direction by virtue of the use of bearing assembly 51. Guides 20 serve to help bearing assembly 51 in this respect, and thus avoid strain in the vicinity of swivel 52.

A swivel coupling 22 is secured at the outer end of rigid pipe 19. A flexible cargo hose 23 is secured to swivel 22. A bracket 24 is secured to rigid pipe 19 by bearing supports 25, and is secured to hose 23 by clamps 26. Bearing supports 25 permit rotation of hose 23 about the axis of pipe 19. Thus, bracket 24 permits hose 23 to move horizontally without necessitating similar movement of rigid pipeline 19. However, bracket 24 relieves the stresses on coupling 22 which would otherwise be caused by downward pull of hose 23, for example.

Curved guide 27 attached to bracket 24 serves as a support for hose 23.

A pulley block receiving eyelet 29 is secured near the outer end of pipe 19, and a pulley 30 is attached to eyelet 29.

Winch 31, operated by its own reversible motor 32, is positioned on a platform 33 of the tower 10. Each assembly including pipe 19 and hose 23 is provided with a separate winch 31. A cable 34 has one of its ends secured to the drum of winch 31. The cable 34 is passed around a tower-supported pulley 35, around the pulley 30 on pipe 19, and around a second tower-supported pulley 36. The other end of cable 34 is secured to the control member 37 of a conventional constant tension device 38.

Referring to FIG. 7 of the drawings, motor 32 is connected through a conventional motor control 39 to the constant tension device 38. Motor control 39 is connected to a power source P. A manual control switch 40 for motor 32 is also provided. All of the manual control switches 40 for all of the motors 32 are preferably located at a common position on a control panel 41 provided in the tower 10 on, for example, observation platform 42. This platform is located on the tower 10 at a position affording the operator a full view of the tanker to be serviced and the pipes 19 and hoses 23 needed to service it. If desired, duplicate panels 41 may be provided at platform positions on either side of the tower, each having those particular controls which will be required to monitor operation on that side of tower 10.

A hook receiving eyelet 28 is secured to hose 23 adjacent its seaward end.

Crane means in the form of a retractable, rotatable boom 43 is mounted at the top of the tower. This boom 43 is operated by conventional motor arrangements (not shown) to rotate it to desired positions at either side of the tower 10. A hook 45 is suspended by cable 44 from boom 43, and hook 45 may be lowered or elevated as required by a motor operated winch (not shown) in the boom 43. Hook 45 is manually coupled to eyelet 28 on hose 23. Rotation of the boom 43, and elevation or lowering of cable 44 may be effected by motor controls (not shown) of conventional kind positioned on control panel 41. Retraction and extension of boom 43 may also be controlled to provide additional transverse movement of the hook 45.

As an alternative, the boom 43 at the top of the tower may, as shown in FIG. 8, be replaced by a rotating boom and mast arrangement 46 of conventional type also supported preferably at the top of the tower 10. This arrangement includes boom 53 and a cable 47 bearing a hook 48 which may be lowered or raised in similar manner to hook 45 for coupling with a selected eyelet 28. The boom and mast control motor (not shown) that serves to swing it to desired position as well as the winch operating motor (not shown) to control cable 47 also may be operated from controls on panel 41. Boom 53 may be raised or lowered to provide transverse movement of the hook 48.

Other types of crane means for handling the free ends of the hoses during their attachments and dis-attachments may be utilized.

*Operation*

When not in operation, the respective pipes 19 are stored in their uppermost angular positions. In such condition, the hoses 23 lie suspended substantially vertically near the sides of the tower 10, and, if desired, the hoses, may be lashed to the tower 10.

When a tanker $T_1$, for example, arrives at a berth on one side of the pier W, it is secured dockside so that the standpipes 49 of its loading manifold 50 are disposed approximately opposite the hoses 23 at that side of tower 10.

The following description involves the operation of only one of the pipe and hose assemblies. However, it is to be appreciated that such operation is typical and several hoses may be connected to one vessel if there are sufficient connections on the vessel to make this type of unloading feasible. Hoses 23 may also be crossed, if necessary, to achieve the desired manifolding.

The first step in making connection between the seaward end of hose 23 and standpipe 49 involves coupling hook 45 to eyelet 28. The hose 23 is then unlashed. Next, which motor 32 is operated to feed cable 34 so that rigid pipe 19 is lowered, for example, to the approximate angle shown in FIG. 1. At the same time, boom 43 is extended to carry hook 45 and the outer end of hose 23 toward tanker $T_2$. It is readily seen that the operator stationed on platform 42 at control panel 41 is capable of moving the seaward end of hose 23 vertically by raising or lowering hook 45. The operator is also capable of moving the seaward end of hose 23 in a horizontal direction by rotating boom 43. Rotation of boom 43 to move the seaward end of hose 23 is aided by swivel 22. At the same time that horizontal and vertical corrections are made by operation of boom 43 and cable 44, the length of hose 23 necessary to reach standpipe 49 is provided by raising or lowering rigid pipe 19 by operation of winch 32. Thus, it is seen that the seaward end of hose 23 is brought into alignment with the standpipe 49 by coordinated control of winch motor 32, boom 43 and cable 44. Once aligned, a coupling between hose 23 and standpipe 49 may be effected by one or two men stationed on the deck of the tanker.

After the coupling of hose 23 to standpipe 49, hook 45 is disengaged and the operator sets the controls on panel 41 to activate the constant tension device 38 associated with the particular pipe 19 involved. Thus, a condition of slackness or excessive tension in cable 34 is transmitted to the control member 37 to which it is coupled. This operates conventional switches (not shown) within constant tension device 38 to energize the winch motor 32 thereby providing rotation in the proper direction to achieve the desired tension condition. Operation of motor 32 sets the tension in cable 34 at the desired level by raising or lowering rigid pipe 19. Of course, the desired tension condition in cable 34 is determined by the tension which is desired in hose 23.

Thus, for example, assuming that unloading a tanker causes it to rise in the water, this would tend to cause hose 23 to kink. At the same time the tension in cable 34 will be below the set point. This will be transmitted to constant tension device 38 which will cause pipe 19 to move upwardly, thus removing the kinking tendency of hose 23. When the tension in cable 34 reaches the set point as a result of such upward movement, winch 32 will cease movement of pipe 19. On the other hand, if the tanker moves down into the water, there will be excessive tension in hose 23 which must be compensated by downward movement of pipe 19. Unless the stress or tension in hose 23 is maintained within reasonable limits, the hose 23 will rupture.

Movement of the tanker being unloaded away from the pier W would tend to increase the tension in hose 23 and also increase the tension in cable 34. As in the situation discussed above, constant tension device 38 will then operate to lower rigid pipe 19 to alleviate this condition.

It is also possible for the tanker to move longitudinally along the pier W. In such instance, swivel 22 in conjunction with constant tension device 38 would tend to keep the tension in hose 23 at the desired level. However, to reduce the cost of the unit, swivel 22 may be omitted. Generally, the length of hose 23 is adequate to compensate for normal longitudinal movement.

Thus, it can be seen that once the connection of hose 23 to standpipe 49 is made, and the apparatus placed under the control of the constant tension device 38, it becomes completely automatic in operation. All relative changes of position between the tanker and the shore-based pipe are compensated for by one or more of the structural parts of the device described herein.

Although constant tension device 38 has been described above for use in conjunction with maintaining proper tension on hose 23, it is to be understood that any equivalent type of device may be substituted. Thus, for example, a counterweight system could be employed. After initially aligning hose 23 with stand pipe 49 and coupling the two together, the rigid pipe 19 is placed under the sole control of counterweights which would automatically maintain the desired tension in hose 23. Any extensive tension pulling down on the end of rigid pipe 19 would result in the counterweights moving up and pipe 19 moving down. Conversely, any decrease in tension resulting from the tanker moving closer to the pier or rising out of the water would be compensated by downward movement of the counterweight and upward movement of rigid pipe 19.

If a tanker $T_2$ becomes berthed at the other side of the wharf the same hose attachment procedure described with hoses on the other side of the tower is practiced.

If the tower is built on a marginal wharf all of the pipe lines 19 and their hoses 23 may lie on the outshore side of the tower.

While specific embodiments of the invention have been described, variations in structural detail within the scope of the appended claims are possible and are contemplated. There is no intention therefore of limitation to the exact disclosures herein made.

What is claimed is:

1. Apparatus for transferring liquids between a vessel and a shore-based pipeline comprising a tower, a relatively long rigid pipe connected at one end to a short pipe section to form a T, said short pipe section being mounted in a bearing assembly to permit rotation of said short pipe section about its longitudinal axis, said bearing assembly being located at a relatively low level of said tower and being oriented to permit said rigid pipe to pivot in a vertical plane inwardly and outwardly of said tower, a first swivel joint connecting said short pipe section with said shore-based pipeline, guide means attached to said tower for confining pivotal movement of said rigid pipe in a vertical plane, a second swivel joint connected to the other end of said rigid pipe, a flexible conduit one end of which is connected to the said second swivel joint whereby the said conduit is rotatable with respect to the said rigid pipe, reinforcing means connected between said flexible conduit and said rigid pipe to prevent relative movement therebetween other than by rotation through said second swivel joint, power means connected to said rigid pipe to pivot said pipe about said bearing assembly, crane means located adjacent the top of said tower and rotatable about a vertical axis, said crane means being adapted to connect to and transport the other end of the flexible conduit both in horizontal and vertical directions, and means to automatically pivot said rigid pipe inwardly and outwardly of said tower in response to the changes in tension in said flexible conduit.

2. Apparatus for transferring liquids between a vessel and a shore-based pipeline comprising a tower, a relatively long rigid pipe mounted in a bearing assembly, said assembly being located at a relatively low level of said tower and being oriented to permit said rigid pipe to pivot in a vertical plane inwardly and outwardly of said tower, a first swivel joint connected between said rigid pipe and said shore-based pipeline, guide means attached to said tower for confining pivotal movement of said rigid pipe in a vertical plane, a second swivel joint connected to the other end of said rigid pipe, a flexible conduit one end of which is connected to the said second swivel joint whereby the said conduit is rotatable with respect to the said rigid pipe, reinforcing means connected between said flexible conduit and said rigid pipe to prevent relative movement therebetween other than by rotation through said second swivel joint, power means connected to said rigid pipe to pivot said pipe about said bearing assembly, crane means located adjacent the top of said tower and rotatable about a vertical axis, said crane means being adapted to connect to and transport the other end of the flexible conduit in both horizontal and vertical directions, and means to automatically pivot said rigid pipe inwardly and outwardly of said tower in response to the changes in tension in said flexible conduit.

3. Apparatus for transferring liquids between a vessel and a shore-based pipeline comprising a tower, a relatively long rigid pipe mounted in a bearing assembly, said assembly being located at a relatively low level of said tower and being oriented to permit said rigid pipe to pivot in a vertical plane inwardly and outwardly of said tower, a first swivel joint connected between said rigid pipe and said shore-based pipeline, guide means attached to said tower for confining pivotal movement of said rigid pipe in a vertical plane, a second swivel joint connected to the other end of said rigid pipe, a flexible conduit one end of which is connected to the said second swivel joint whereby the said conduit is rotatable with respect to the said rigid pipe, power means connected to said rigid pipe to pivot said pipe about said bearing assembly, crane means located adjacent the top of said tower and rotatable about a vertical axis, said crane means being adapted to connect to and transport the other end of the flexible conduit in both horizontal and vertical directions, and means to automatically pivot said rigid pipe inwardly and outwardly of said tower in response to the changes in tension in said flexible conduit.

4. Apparatus for transferring liquids between a vessel and a shore-based pipeline comprising a tower, a relatively long rigid pipe pivotally mounted about a horizontal axis which is located at a relatively low level of said tower, said rigid pipe being pivotable in a vertical plane inwardly and outwardly of said tower, a first swivel joint connected between said rigid pipe and said shore-based pipeline, guide means attached to said tower for confining pivotal movement of said rigid pipe in a vertical plane, a second swivel joint connected to the other end of said rigid pipe, a flexible conduit one end of which is connected to the said second swivel joint whereby the said conduit is rotatable with respect to said rigid pipe, power means connected to said rigid pipe to pivot said pipe about said horizontal axis, crane means located adjacent the top of said tower and rotatable about a vertical axis, said crane means being adapted to connect to and transport the other end of the flexible conduit in both horizontal and vertical directions, and means to automatically pivot said rigid pipe inwardly and outwardly of said tower in response to the changes in tension in said flexible conduit.

5. Apparatus for transferring liquids between a vessel and a shore-based pipeline comprising a tower, a relatively long rigid pipe pivotally mounted about a horizontal axis which is located at a relatively low level of said tower, said rigid pipe being pivotable in a vertical plane inwardly and outwardly of said tower, a first swivel joint connected between said rigid pipe and said shore-based pipeline, a second swivel joint connected to the other end of said rigid pipe, a flexible conduit one end of which is connected to the said second swivel joint whereby the said conduit is rotatable with respect to the said rigid pipe, power means connected to said rigid pipe to pivot said pipe about said horizontal axis, crane means located adjacent the top of said tower and rotatable about a vertical axis, said crane being adapted to connect to and transport the other end of the flexible conduit in both horizontal and vertical directions, and means to automatically pivot said rigid pipe inwardly and outwardly of said tower in response to the changes in tension in said flexible conduit.

6. Apparatus for transferring liquids between a vessel and a shore-based pipeline comprising a tower, a relatively long rigid pipe pivotally connected at one end about a horizontal axis located at a relatively low level of said tower, said pipe being disposed to pivot inwardly and outwardly of said tower in a vertical plane, a flexible conduit rotatably connected at one end to the free end of said rigid pipe, power means connected through cables to the said rigid pipe to pivot said pipe inwardly and outwardly of said tower, crane means located adjacent the top of said tower and adapted to connect to and transport the other end of said flexible conduit in both horizontal and vertical directions, constant tension means responsive to the tension in said cables to pivot said rigid pipe inwardly and outwardly of said tower, said constant tension means being operative through control of said power means.

References Cited by the Examiner
UNITED STATES PATENTS

| 1,478,925 | 12/23 | Steed | 137—615 |
| 2,818,891 | 1/58 | Loeser | 141—388 |
| 2,922,446 | 1/60 | Sheiry | 141—388 |
| 2,980,150 | 4/61 | Bily | 141—387 |

LAVERNE D. GEIGER, *Primary Examiner.*